United States Patent
Webster et al.

(10) Patent No.: US 7,752,849 B2
(45) Date of Patent: Jul. 13, 2010

(54) ARRANGEMENT FOR CONTROLLING FLOW OF FLUID TO A COMPONENT OF A GAS TURBINE ENGINE

(75) Inventors: John R. Webster, Derby (GB); Bradley S. Payne, Leek (GB)

(73) Assignee: Rolls-Royce plc, London (GB)

( * ) Notice: Subject to any disclaimer, the term of this patent is extended or adjusted under 35 U.S.C. 154(b) by 838 days.

(21) Appl. No.: 11/216,124

(22) Filed: Sep. 1, 2005

(65) Prior Publication Data
US 2006/0042260 A1 Mar. 2, 2006

(30) Foreign Application Priority Data
Sep. 2, 2004 (GB) .................... 0419436.1

(51) Int. Cl.
*F02K 6/04* (2006.01)
(52) U.S. Cl. .......................................... 60/785; 60/806
(58) Field of Classification Search ................ 60/39.81, 60/806, 785, 782; 415/47–48; 236/48 A, 236/93 R; 137/468
See application file for complete search history.

(56) References Cited
U.S. PATENT DOCUMENTS

| | | | |
|---|---|---|---|
| 2,248,798 A | 7/1941 | Wittmann | |
| 2,601,579 A * | 6/1952 | Wittmann | .................... 236/88 |
| 2,719,197 A | 9/1955 | Hall | |
| 3,145,768 A | 8/1964 | Parker | |
| 4,005,726 A | 2/1977 | Fowler | |
| 4,807,433 A * | 2/1989 | Maclin et al. | .................. 60/795 |
| 2002/0001519 A1* | 1/2002 | Webster | ....................... 415/10 |
| 2004/0025949 A1* | 2/2004 | Wygnaski | .............. 137/624.18 |
| 2007/0151252 A1* | 7/2007 | Cornwell et al. | .............. 60/773 |

FOREIGN PATENT DOCUMENTS

| | | |
|---|---|---|
| DE | 4 401 585 A | 7/1995 |
| GB | 0 605 093 SP | 7/1948 |
| GB | 2 354 290 A | 3/2001 |

* cited by examiner

*Primary Examiner*—Michael Cuff
*Assistant Examiner*—Phutthiwat Wongwian
(74) *Attorney, Agent, or Firm*—Jeffrey S. Melcher; Manelli Denison & Selter PLLC

(57) ABSTRACT

An arrangement for controlling flow of fluid to a component of a gas turbine engine, the arrangement comprising: a conduit, coupled to a supply of fluid, for providing fluid to the component of the gas turbine engine; a magnetic valve for at least partially restricting the conduit and having a valve member with at least a first configuration in which the conduit is at least partially restricted and a second configuration in which the conduit is relatively open, wherein the configuration of the valve member is controlled by magnetic flux in a magnetic circuit which includes at least one member comprising ferromagnetic material, whereby the configuration is responsive to the temperature of the ferromagnetic material.

14 Claims, 9 Drawing Sheets

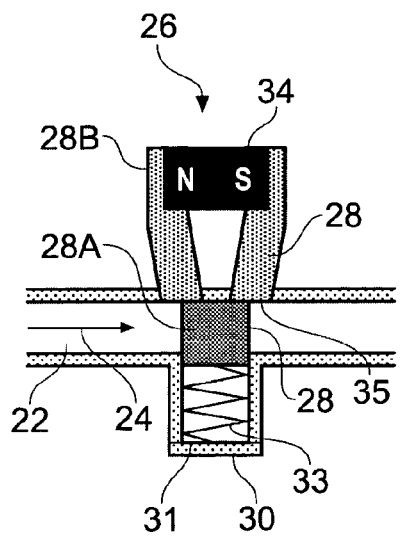
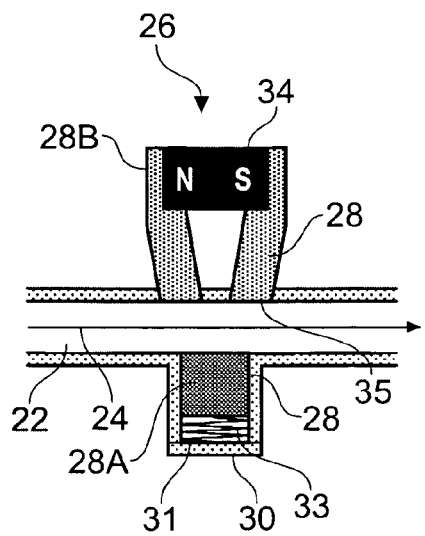
Fig. 4A    Fig. 4B
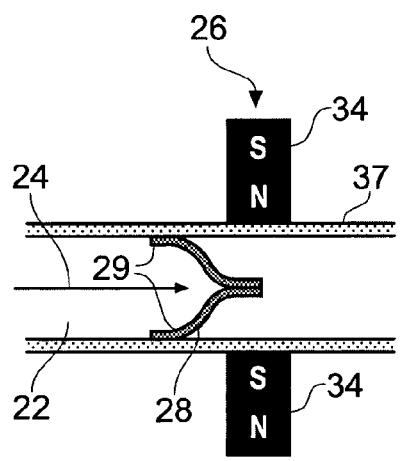
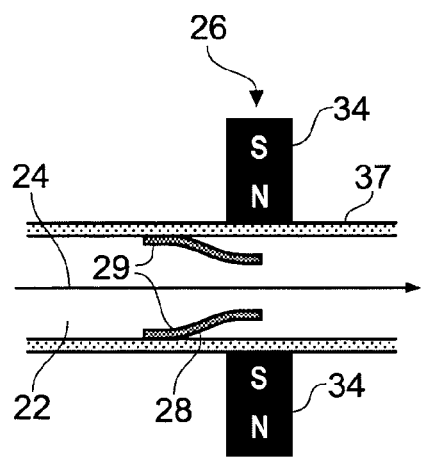
Fig. 5A    Fig. 5B

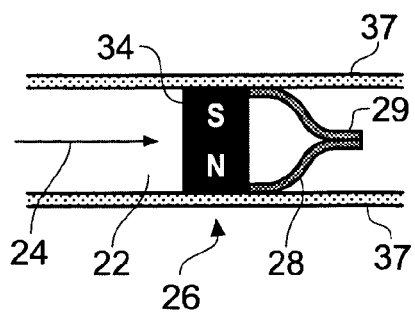
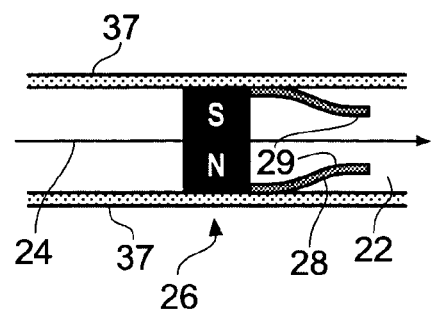
Fig. 6A	Fig. 6B
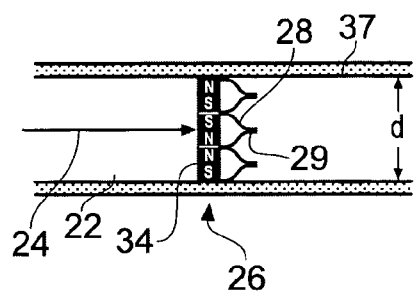
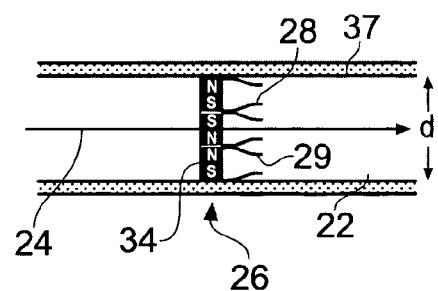
Fig. 7A	Fig. 7B
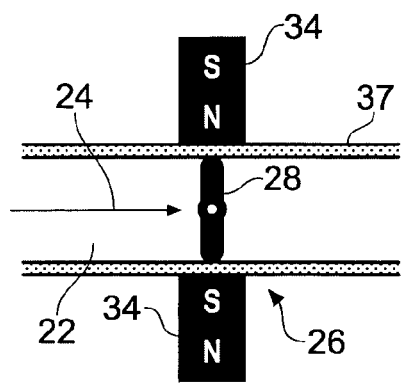
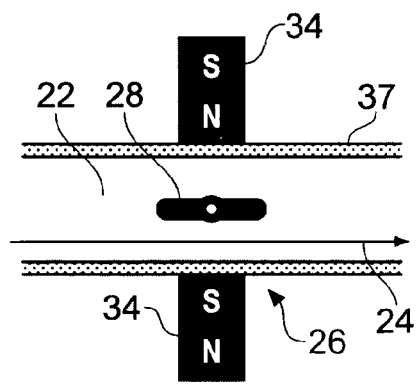
Fig. 8A	Fig. 8B

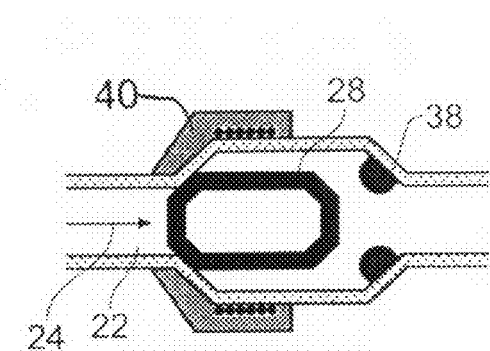
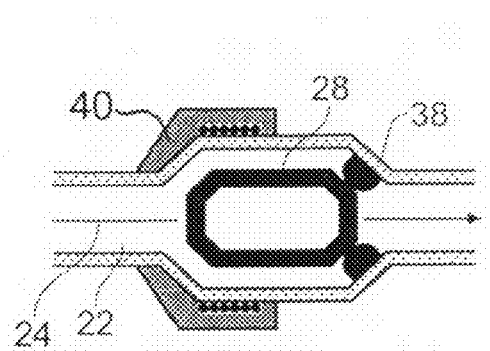
Fig. 12A    Fig. 12B
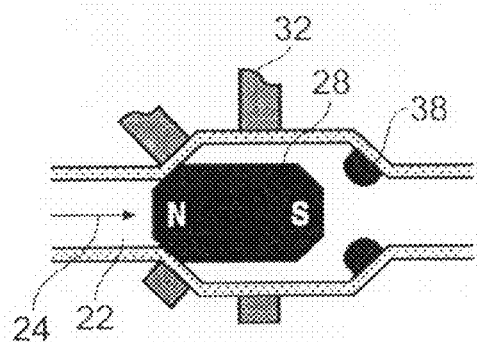
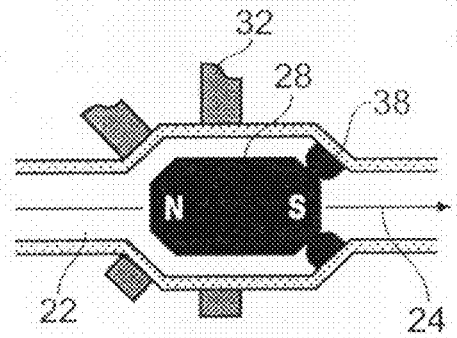
Fig. 13A    Fig. 13B
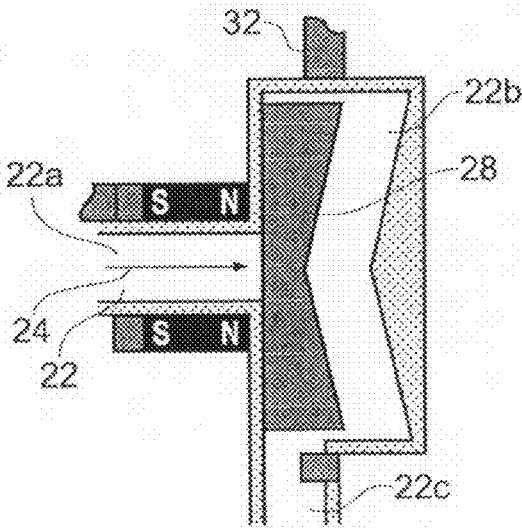
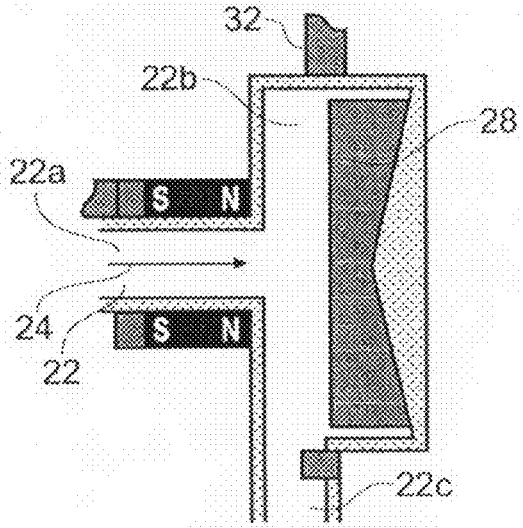
Fig. 14A    Fig. 14B

ARRANGEMENT FOR CONTROLLING FLOW OF FLUID TO A COMPONENT OF A GAS TURBINE ENGINE

FIELD OF THE INVENTION

Embodiments of the present invention relate to an arrangement for controlling flow of fluid to a component of a gas turbine engine.

BACKGROUND TO THE INVENTION

Gas turbine engines operate at high temperatures which may be greater than the melting point of the component parts of the gas turbine engine. These components require cooling during the operation of the gas turbine engine. There are some instances where a gas turbine engine will be working to a higher than normal capacity (for example, during take-off of an aeroplane if the engine is an aero engine) and components which do not usually require cooling in normal operation, will require cooling. Consequently, it is desirable to provide a means for modulating the flow of fluid to these components.

BRIEF DESCRIPTION OF THE INVENTION

According to one aspect of the present invention there is provided an arrangement for controlling flow of fluid to a component of a gas turbine engine, the arrangement comprising: a conduit, coupled to a supply of fluid, for providing fluid to the component of the gas turbine engine; a magnetic valve for at least partially restricting the conduit and having a valve member with at least a first configuration in which the conduit is at least partially restricted and a second configuration in which the conduit is relatively open, wherein the configuration of the valve member is controlled by magnetic flux in a magnetic circuit which includes at least one member comprising ferromagnetic material, whereby the configuration is responsive to the temperature of the ferromagnetic material.

The member comprising ferromagnetic material may be thermally coupled to the fluid. The member comprising ferromagnetic material may be thermally coupled to the component.

The valve member may be located in a non-rotating part of the gas turbine engine and the magnetic circuit may include at least a part located in a rotating part of the gas turbine engine.

The supply of fluid may be a compressor of the gas turbine engine. The component may be any one of: a turbine blade tip seal, a turbine blade or a nozzle guide vane. The component may be cooled by the fluid when the valve member is in at least the second configuration. The fluid may be provided to a second component of the gas turbine engine when the valve member is in the first configuration. The second component may be a combustor of the gas turbine engine. The fluid may be air.

The magnetic valve may comprise an electromagnet, permanent magnet, or both. The magnetic valve may comprise a plurality of valve members.

The valve member may be hollow or solid. The valve member may comprise ferromagnetic material and magnetic material. The valve member may be moved by the pressure of the fluid when the valve member is in the second configuration.

According to a further aspect of the present invention there is provided a magnetic valve for an arrangement as described in the preceding paragraphs.

According to another aspect of the present invention there is provided a method of controlling flow of fluid to a component of a gas turbine engine; the method comprising: providing fluid to the component of the gas turbine engine via a conduit; partially restricting the conduit using a magnetic valve having a valve member with at least a first configuration in which the conduit is at least partially restricted and a second configuration in which the conduit is relatively open, wherein the configuration of the valve member is controlled by magnetic flux in a magnetic circuit which includes at least one member comprising ferromagnetic material, whereby the configuration is responsive to the temperature of the ferromagnetic material.

BRIEF DESCRIPTION OF THE DRAWINGS

For a better understanding of the present invention reference will now be made by way of example only to the accompanying drawings in which:

FIG. 4A illustrates a first example of a magnetic valve in a first configuration;

FIG. 4B illustrates a first example of a magnetic valve in a second configuration;

FIG. 5A illustrates a second example of a magnetic valve in a first configuration;

FIG. 5B illustrates a second example of a magnetic valve in a second configuration;

FIG. 6A illustrates a third example of a magnetic valve in a first configuration;

FIG. 6B illustrates a third example of a magnetic valve in a second configuration;

FIG. 7A illustrates a fourth example of a magnetic valve in a first configuration;

FIG. 7B illustrates a fourth example of a magnetic valve in a second configuration;

FIG. 8A illustrates a fifth example of a magnetic valve in a first configuration;

FIG. 8B illustrates a fifth example of a magnetic valve in a second configuration;

FIG. 12A illustrates a ninth example of a magnetic valve in a first configuration;

FIG. 12B illustrates a ninth example of a magnetic valve in a second configuration;

FIG. 13A illustrates a tenth example of a magnetic valve in a first configuration;

FIG. 13B illustrates a tenth example of a magnetic valve in a second configuration;

FIG. 14A illustrates an eleventh example of a magnetic valve in a first configuration;

FIG. 14B illustrates an eleventh example of a magnetic valve in a second configuration.

DETAILED DESCRIPTION OF EMBODIMENTS OF THE INVENTION

Figure 1:
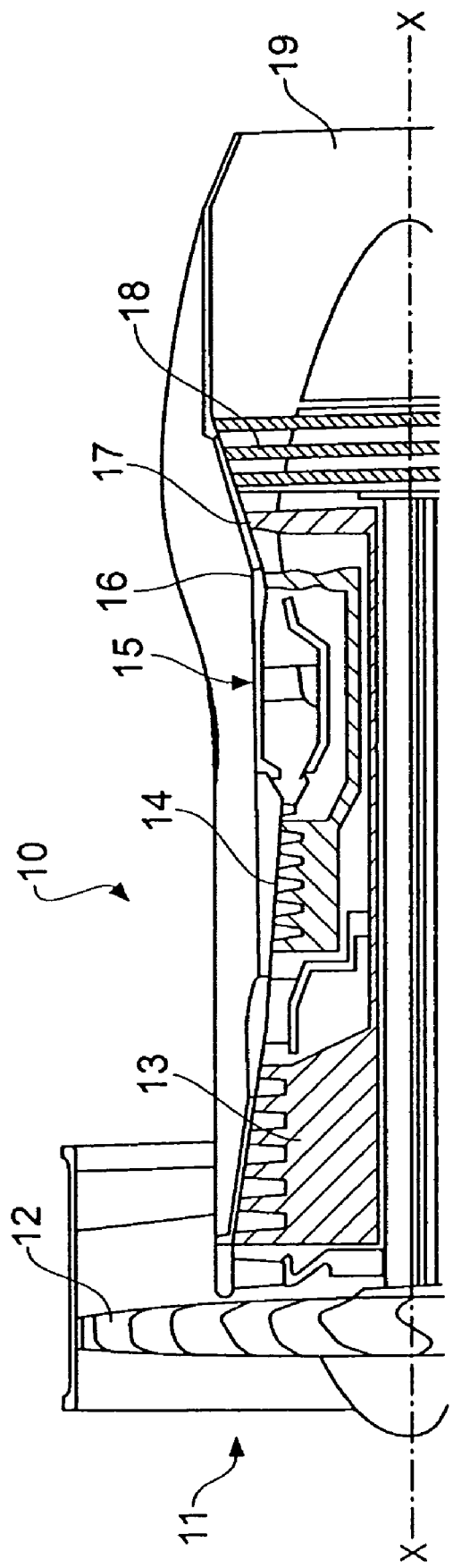
FIG. 1 illustrates a sectional side view of the upper half of a gas turbine engine.

The embodiments to be described relate to a gas turbine engine of the type illustrated in FIG. 1. The gas turbine engine of FIG. 1 is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17, a low pressure turbine 18 and an exhaust nozzle 19.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high, and intermediate pressure compressors 14 and 13 and the fan 12 by suitable interconnecting shafts.

High temperatures arise within the gas turbine engine during operation. Various components thus require cooling. The embodiments described below relate particularly, but not exclusively, to the control of cooling.

The remaining figures illustrate an arrangement 20 for controlling flow of fluid, such as cooling fluid, to a component of a gas turbine engine 10. The arrangement 20 comprises: a conduit 22, coupled to a supply of fluid, for providing fluid to the component of the gas turbine engine 10; a magnetic valve 26 for at least partially restricting the conduit 22 and having a valve member 28 with at least a first configuration in which the conduit 22 is at least partially restricted and a second configuration in which the conduit 22 is relatively open, wherein the configuration of the valve member 28 is controlled by magnetic flux in a magnetic circuit which includes at least one member comprising ferromagnetic material, whereby the configuration is responsive to the temperature of the member comprising ferromagnetic material.

Figure 2B:
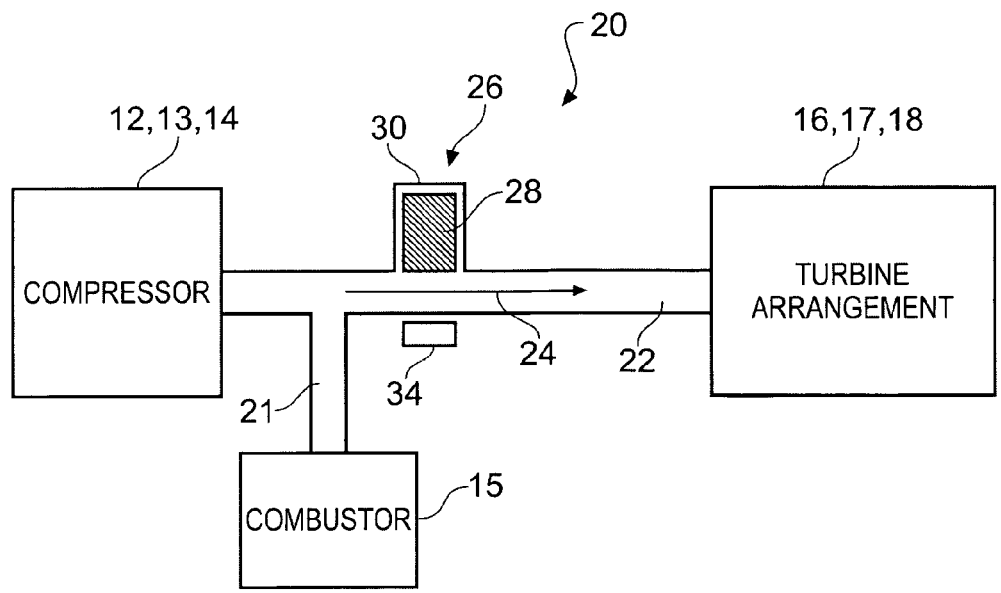
FIG. 2B illustrates a schematic diagram of the embodiment illustrated in FIG. 2A operating in a second configuration.
Figure 2A:
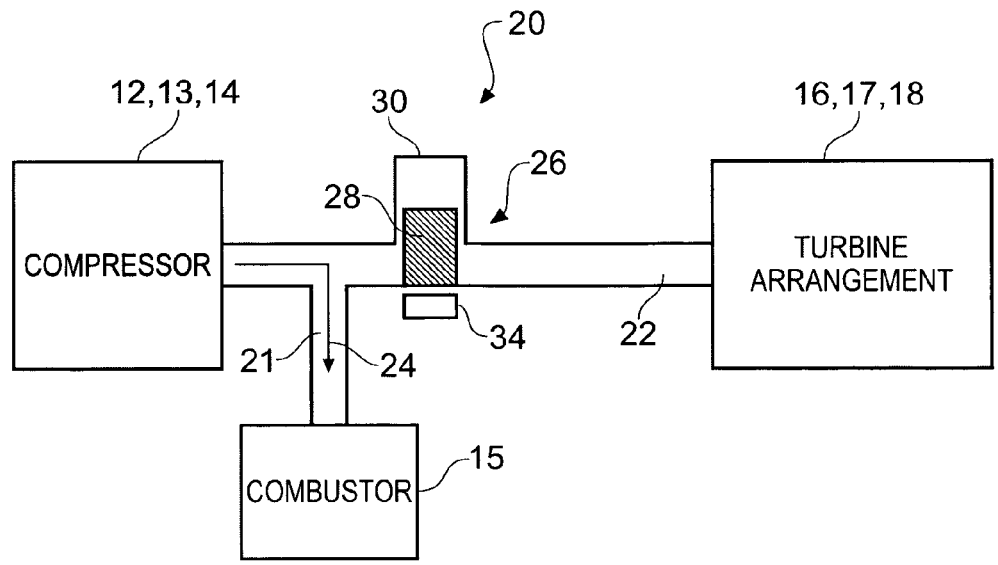
FIG. 2A illustrates a schematic diagram of one embodiment of the present invention operating in a first configuration.

FIGS. 2A and 2B illustrate a schematic diagram of one embodiment of the present invention. With reference to FIG. 2A, a component of the gas turbine engine 10 (for example, the turbine arrangement 16, 17, 18) is coupled to a supply of cooling fluid (for example, the compressor 12, 13, 14) via a conduit 22. The conduit 22 is in this example, a pipe for transporting fluid. The direction of the flow of fluid is indicated generally by arrow 24. For example, cooling fluid may be supplied to components of the turbine, from the compressor, through the conduit 22. A magnetic valve 26 is provided in the conduit 22 for controlling the flow of cooling fluid to the component. The cooling fluid is, in this example, air.

The magnetic valve 26 comprises a valve member 28 which has at least two configurations. FIG. 2A illustrates the first configuration of the valve member 28 whereby the valve member 28 restricts the conduit 22 so that the fluid provided by the compressor 12, 13, 14 is diverted from the turbine arrangement 16, 17, 18, to be received by the combustor 15. The valve member 28 is preferably arranged not to completely restrict the flow of fluid 24. Consequently, some fluid will continue to pass the valve member 28, and the temperature of the fluid 24 and of the valve member 28 will remain closely similar. FIG. 2B illustrates a second configuration in which the valve member 28 is in a recess 30 and consequently, the conduit 22 is relatively or fully open. In the second configuration, fluid is provided to the turbine arrangement 16, 17, 18.

A permanent magnet 34 is located outside the conduit 22, generally opposite the recess 30, for reasons which will become apparent.

The two configurations represent two operating states of a gas turbine engine. FIG. 2A represents the gas turbine engine working under operating conditions in which the turbine arrangement 16, 17, 18 does not require the fluid 24 for cooling purposes and therefore the fluid 24 can be provided to the combustor 15. Advantages of providing the fluid 24 to the combustor 15 are that the combustor 15 may be cooled by the fluid 24 and that a quantity of burnt fuel in the combustor may be flushed by the fluid 24, thereby lowering nitrogen oxide (NOx) emissions.

FIG. 2B represents the gas turbine engine when it is operating at a higher than normal capacity and is therefore at a relatively high temperature. In this operating configuration, it is necessary to cool the turbine arrangement 16, 17, 18 with the fluid 24. Since the valve member 28 is in the recess 30, the conduit 22 is relatively open and allows fluid 24 to be provided to the turbine arrangement 16, 17, 18. The fluid 24 may be used to cool any part of the turbine arrangement 16, 17, 18 and in particular intermediate pressure (IP) turbine blade tip seals, turbine blades or nozzle guide vanes. High pressure (HP) turbine blade tip seals, turbine blades or nozzle guide vanes may require at least a portion of the fluid 24 in all operating states. This may be provided by an alternative, unmodulated arrangement (not shown) or by ensuring that adequate flow through the valve 26 is possible even in the restricted condition of FIG. 2A.

The valve member 28 comprises ferromagnetic material having a Curie point. The Curie point is the temperature at which a magnetic material significantly loses its magnetic properties. In the first configuration illustrated by FIG. 2A, the temperature of the fluid 24 is below the Curie point of the valve member 28. Consequently, the valve member 28 retains its magnetic properties. A magnetic circuit exists from the permanent magnet, across the conduit 22 and through the valve member 28, and results in sufficient flux to attract the valve member 28 across the conduit 22, toward the permanent magnet 34, thereby restricting the conduit 22. The conduit 22 is preferably not fully closed, as has been described, so that the valve member 28 remains in thermal contact with the fluid in the conduit 22.

In FIG. 2B, the temperature of the fluid 24 is greater than the Curie point of the valve member 28 and therefore the valve member 28 loses its magnetic properties. Consequently, the magnetic flux collapses in the circuit through the permanent magnet 34 and the valve member 28 such that the valve member 28 is no longer attracted to the permanent magnet 34. A spring (not illustrated) may be provided for moving the valve member 28 into the recess 30, when the attraction to the magnet 34 is removed.

Consequently, an advantage provided by embodiments of the present invention is that when the gas turbine engine is operating normally, the fluid 24 is diverted, for example, to the combustor 15 to reduce the emission of nitrogen oxide (NOx). However, when the temperature of the fluid 24 is greater than the Curie point of the valve member 28, fluid 24 is provided to the turbine arrangement 16, 17, 18 to cool the turbine arrangement. Thus, the cooling supply to the turbine arrangement 16, 17, 18 is self modulating.

Figure 3B:
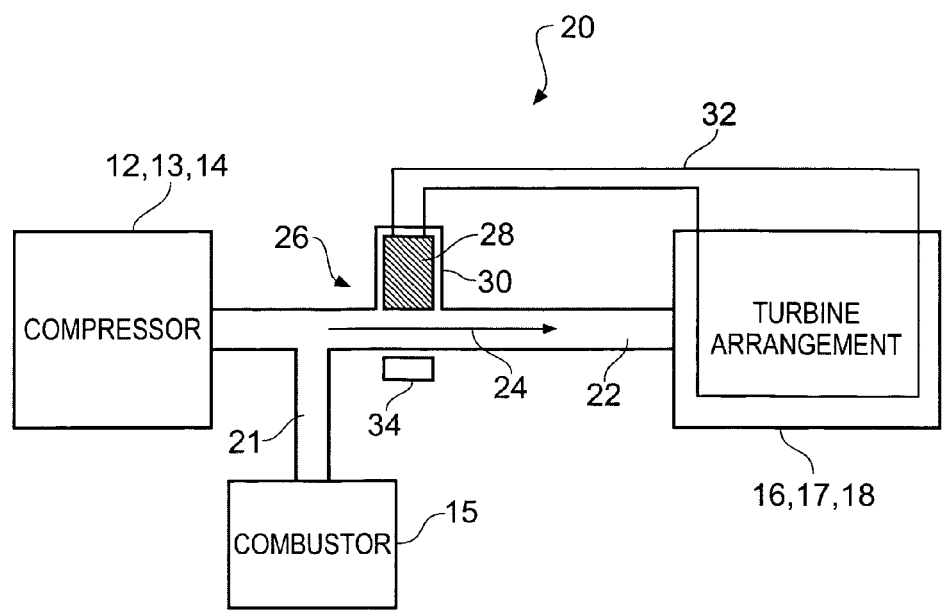
FIG. 3B illustrates a schematic diagram of the embodiment illustrated in FIG. 3A operating in a second configuration.
Figure 3A:
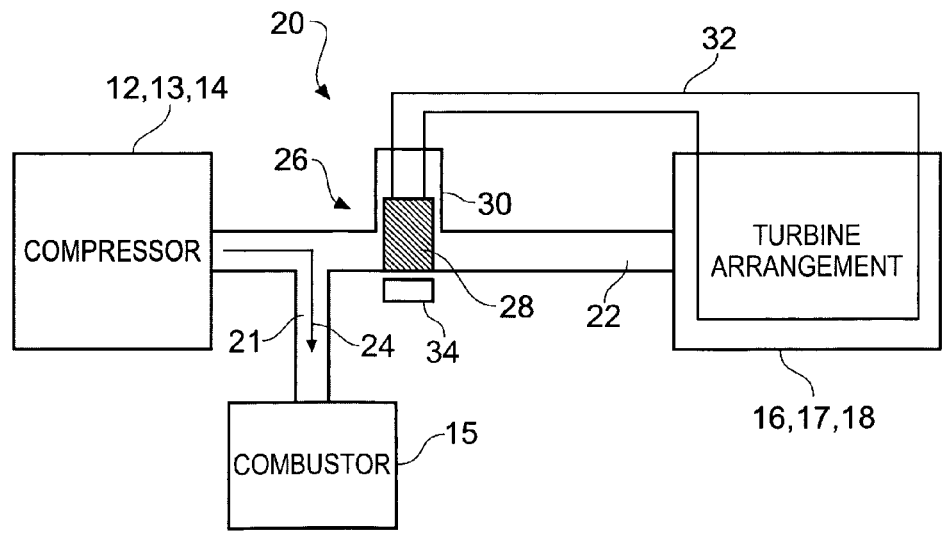
FIG. 3A illustrates a schematic diagram of a second embodiment of the present invention operating in a first configuration.

FIGS. 3A and 3B are schematic diagrams of a second embodiment of the present invention. FIGS. 3A and 3B are similar to FIGS. 2A and 2B and where the features are the same, the same reference numerals have been used. In this embodiment, the magnetic valve 26 is thermally coupled, via thermal circuit 32, to the component of the gas turbine engine (for example, the turbine arrangement 16, 17, 18). The thermal circuit 32 includes at least some ferromagnetic material, in the valve member 28. The thermal coupling of the ferromagnetic material to the turbine arrangement 16, 17, 18 makes the configuration of the valve member 28 substantially dependent on the temperature of the turbine arrangement 16, 17, 18, as follows.

In the first configuration, illustrated by FIG. 3A, the temperature of the component of the gas turbine engine 10 is less than the Curie point of the valve member 28. Consequently, the ferromagnetic material in the valve member 28 retains its magnetic properties. A magnetic circuit from the permanent magnet 34, across the conduit 22 and through the valve member 28 results in sufficient flux to attract the valve member 28 across the conduit 22, towards the magnet 34, thereby restricting the conduit 22.

In the second configuration, illustrated by FIG. 3B, the temperature of the turbine arrangement 16, 17, 18 is greater than the Curie point of the ferromagnetic material in the valve member 28. Consequently, the magnetic flux collapses in the circuit through the permanent magnet 34 and the valve member 28, such that the valve member 28 is no longer attracted to the permanent magnet 34. A spring (not illustrated) may be provided for moving the valve member 28 into the recess 30, when the attraction to the magnet 34 is removed.

An advantage provided by this embodiment, is that the temperature of the turbine arrangement 16, 17, 18 directly influences the configuration of the valve member 28. Furthermore, the magnetic valve 26 may be located remote from the turbine arrangement 16, 17, 18 of the gas turbine engine 10 because the magnetic and thermal circuits may cross boundaries (for example, non-ferromagnetic vessel walls) or gaps. This is advantageous if the component (for example, a turbine blade) rotates because the magnetic valve 26 may not operate when under a high centrifugal force and can be placed in a non-rotating part of the gas turbine engine.

Figure 3C:
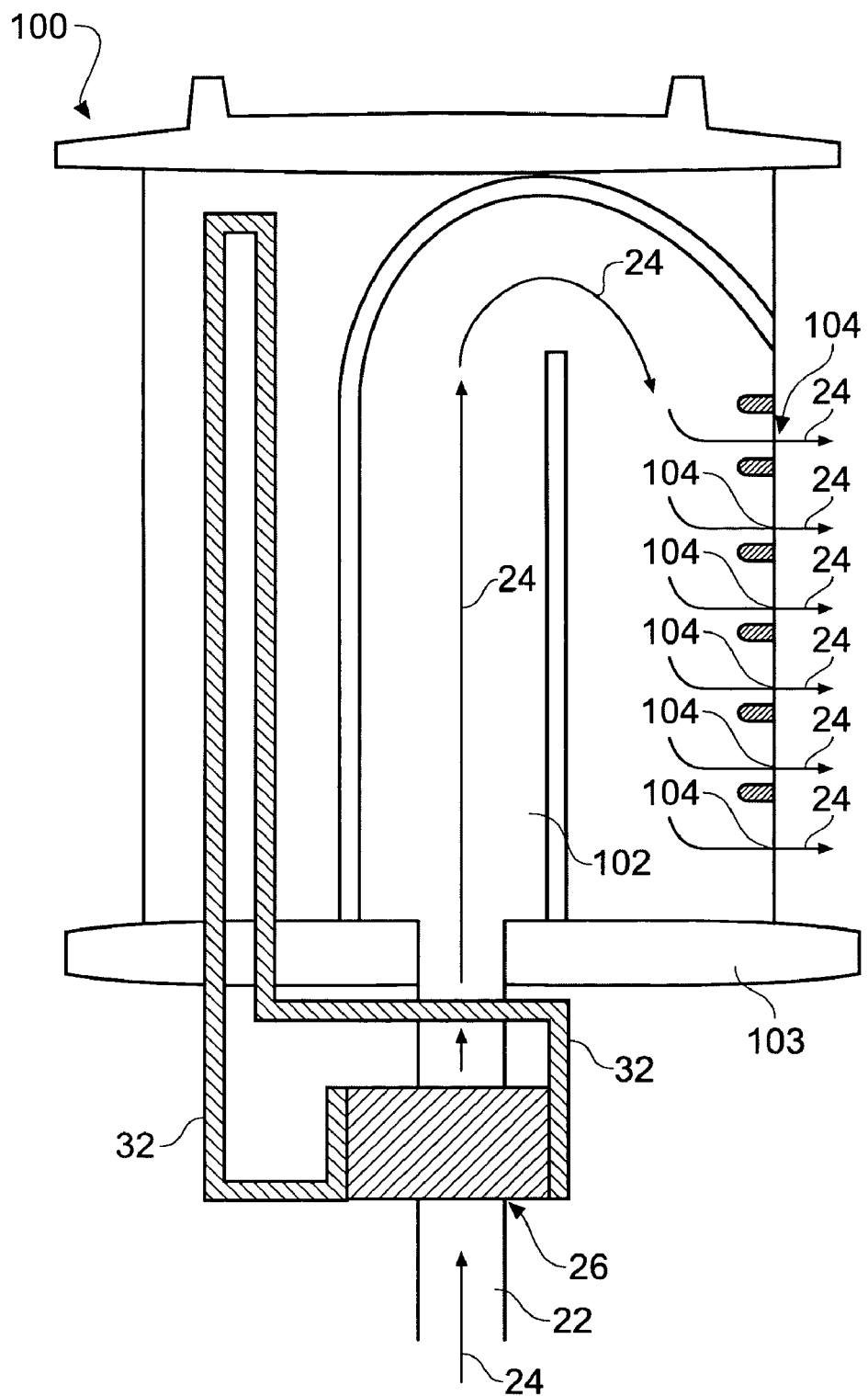
FIG. 3C illustrates a diagram of a nozzle guide vane which receives modulated cooling fluid via a magnetic valve which operates in accordance with the second embodiment of the present invention.

FIG. 3C illustrates a nozzle guide vane 100 which receives modulated cooling fluid 24 via a magnetic valve 26 which operates in accordance with the second embodiment of the present invention and discussed above with reference to FIGS. 3A and 3B. A nozzle guide vane is a static component of the turbine arrangement 16, 17, 18 and is well known in the art of gas turbine engines. Consequently, nozzle guide vanes will not be discussed in detail here. In this embodiment, the nozzle guide vane 100 comprises a passage 102 extending from its base 103 for receiving cooling fluid. A plurality of outlets 104 are provided within the passage 102 for allowing the flow of cooling fluid out of the nozzle guide vane 100 via the outlets 104. The magnetic valve 26 is thermally coupled, by a thermal circuit 32, to the nozzle guide vane 100.

The operation of the magnetic valve 26 is substantially the same as the magnetic valve illustrated in FIGS. 3A and 3B. Consequently, the valve 26 is not shown in detail in FIG. 3C. When the magnetic valve 26 is in the first configuration (see FIG. 3A), it at least partially restricts the flow of cooling fluid 24 within the conduit 22 to the nozzle guide vane 100. When the magnetic valve 26 is in the second configuration (see FIG. 3B), it allows cooling fluid 24 to enter the passage 102. The cooling fluid 24 flows within the passage 102 and exits the nozzle guide vane 100 via the outlets 104, thereby cooling the nozzle guide vane 100.

Figure 3D:
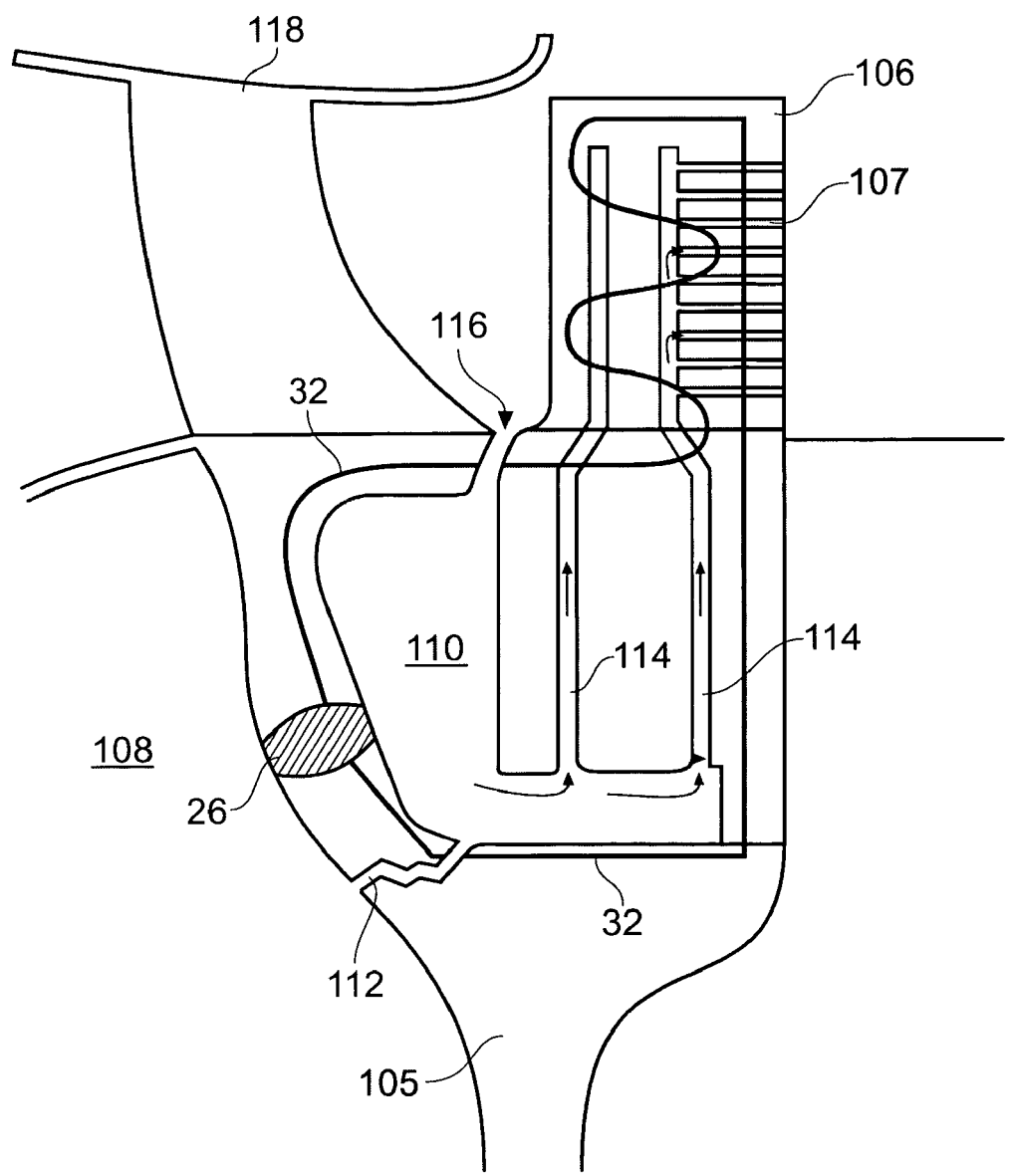
FIG. 3D illustrates a diagram of a turbine blade which receives modulated cooling fluid via a magnetic valve which operates in accordance with the second embodiment of the present invention.

FIG. 3D illustrates a diagram of a turbine blade 106 which receives cooling fluid via a magnetic valve 26 which operates in accordance with the second embodiment of the present invention. A turbine blade is a rotating component of the turbine arrangement 16, 17, 18 and is well known within the art of gas turbine engines. Consequently, the turbine blade 106 will not be discussed in detail here. The turbine arrangement 16, 17, 18 includes a cavity 108 which receives cooling fluid from the compressors 12, 13 and 14. In this embodiment, the turbine blade 106 receives cooling fluid from the cavity 108 via a seal 112 between a nozzle guide vane 118 and the turbine rotor 105. The cooling fluid from the seal 112 enters a further cavity 110 between the turbine blades 106 and the nozzle guide vanes 118 and the cooling fluid may also exit the cavity 110 via an aperture 116 between the platforms of the nozzle guide vanes 118 and the platforms of the turbine blades 106. The cooling air enters passages 114 within the turbine blades 106 and cools the turbine blades 106 by impingement cooling, convection cooling or film cooling as is well known in the art. The cooling fluid leaves the turbine blades 106 through outlets 107 at the trailing edge, at the turbine blade tips or other suitable places where film cooling is required.

The magnetic valve 26 couples the cavity 108 and the cavity 110 and operates in accordance with the second embodiment of the present invention. Consequently, the valve 26 is not shown in detail in FIG. 3D. As discussed above with reference to FIGS. 3A and 3B, in this embodiment the circuit 32 magnetically crosses an air gap at the seal 112 and at the aperture 116 thereby allowing the magnetic valve 26 to be located in a static portion of the turbine arrangement 16, 17, 18.

When the magnetic valve 26 is in the first configuration (see FIG. 3A), it at least partially restricts the flow of cooling fluid from the cavity 108 to the cavity 110. When the magnetic valve is in the second configuration (see FIG. 3B), it allows the flow of cooling fluid from the cavity 108 to cavity 110. The cooling fluid from the magnetic valve 26 enters the turbine blade 106 via the passages 114 and thereby cools the turbine blade 106.

In this example, the magnetic valve 26 provides an advantage in that it supplies an additional flow of cooling fluid to the turbine blade 106 when the cooling fluid from the seal 112 is no longer able to sufficiently cool the turbine blade 106.

FIGS. 4A and 4B illustrate a first example of a magnetic valve 26. In this embodiment, the valve 26 includes a plug 28A of ferromagnetic material and a permanent magnet 34. The plug 28A is coupled to a tension spring 33 which is in turn coupled to a wall 31 of a recess 30 of the conduit 22. The spring 33 is biased to move the plug into the recess 30. The ferromagnetic material 28B is coupled to a wall 35 of a conduit 22, opposite the recess 30, and to a permanent magnet 34.

In normal operation (the first configuration illustrated in FIG. 4A), the temperature of the cooling fluid 24 is less than the Curie point of the valve member 28. A magnetic circuit is formed from the permanent magnet 34 and the ferromagnetic 28B, across the conduit 22 and through the plug 28A. The magnetic circuit has sufficient flux to attract the plug 28A across the conduit 22 toward the ferromagnetic material 28B to thereby restrict the conduit 22. Preferably, the plug 28A does not fully close the conduit 22 so that the plug 28A remains in thermal contact with the fluid in the conduit 22.

In the second configuration, illustrated in FIG. 4B, the temperature of the fluid 24 is greater than the Curie point of the plug 28A and material 28B. Consequently, the magnetic flux collapses in the circuit through the permanent magnet 34, ferromagnetic material 28B and plug 28A such that the plug 28A is no longer attracted to the ferromagnet 28B. The plug is moved into the recess 30 by the spring 33, thereby allowing the flow of fluid 24 through the conduit 22.

In this example, fluid 24 may also pass outside the conduit 22, around the material 28B and confined by an appropriate outer conduit, passage or the like. This second flow is not modulated by the valve being described, but its temperature helps control the valve, by affecting the temperature of the material 28B.

FIGS. 5A and 5B illustrate a second example of a magnetic valve 26. This example works in an opposite sense to the example illustrated in FIGS. 4A and 4B such that when the temperature of the cooling fluid 24 is less than the Curie point of the valve member 28, the conduit 22 is relatively open and when the temperature of the cooling fluid 24 is greater than the Curie point of the valve member 28, the conduit 22 is at least partially restricted. It should be understood that this example of a magnetic valve 26 would need to be placed in conduit 22 of FIGS. 2A, 2B, 3A and 3B in order for it supply cooling fluid to the component of the gas turbine engine when the gas turbine engine is operating at higher than usual temperature.

The magnetic valve 28, in this example, comprises permanent magnets 34 coupled to a wall 37 of the conduit 22 and a valve member 28 which comprises sprung ferromagnetic flexible leaves 29 that are biased to close together (as illustrated in FIG. 5A). Consequently, when the leaves 29 are above the Curie point and non-magnetic, their spring bias moves them together, as shown in FIG. 5A.

In the second configuration, illustrated in FIG. 5B, the temperature of the cooling fluid 24 is less than the Curie point of the flexible leaves 29. Consequently, the flexible leaves 29 retain their magnetic properties and a magnetic circuit extends from the permanent magnets 34, through the flexible leaves 29, resulting in sufficient flux to attract the flexible leaves 34 to the permanent magnets 34. In this configuration, the conduit 22 is relatively open to allow the flow of fluid 24 through the conduit 22.

FIGS. 6A and 6B illustrate a third example of a magnetic valve. A permanent magnet 34 is coupled to a wall 37 of the conduit 22 and to the valve member 28. The valve member 28 comprises sprung ferromagnetic flexible leaves 29. The leaves 29 are biased to move away from one another, towards the wall 37 of the conduit 22.

In the first configuration, illustrated in FIG. 6A, the temperature of the fluid 24 is less than the Curie point of the flexible leaves 29. Consequently, the flexible leaves 29 retain their magnetic properties. A magnetic circuit extends from the permanent magnet 34, through the flexible leaves 29 and has sufficient flux to move the flexible leaves 29 towards one another to at least partially restrict the conduit 22.

In the second configuration, illustrated in FIG. 6B, the temperature of the fluid 24 is greater than the Curie point of the flexible leaves 29, the flexible leaves 29 lose their magnetic properties and consequently the magnetic flux collapses in the circuit through the permanent magnet 34 and the flexible leaves 29 so that the flexible leaves 29 are no longer attracted to the permanent magnet 34. The flexible leaves 29 thus move towards the wall 37 of the conduit 22 thereby making the conduit 22 relatively open to allow the flow of fluid 24 therethrough.

FIGS. 7A and 7B illustrate a fourth example of a magnetic valve 26. This example is similar to the example illustrated in FIGS. 6A and 6B except that it comprises a plurality of permanent magnets 34 and a plurality of sets of ferromagnetic leaves 29. This embodiment works in a similar way to the embodiment illustrated in FIGS. 6A and 6B but may be used where the diameter d of the conduit is relatively large (for example, approximately 35 mm). The plurality of permanent magnets 34 provide a more uniform magnetic field across the conduit 22 than a single permanent magnet. Furthermore, if a single permanent magnet was used, the magnetic flux density of the magnet would have to be large to account for the large diameter d of the conduit 22.

FIGS. 8A and 8B illustrate a fifth example of a magnetic valve 26. Permanent magnets 34 are located outside of, and coupled to the wall 37 of the conduit 22. A valve member 28 is provided in the conduit 22 which has a circular shape corresponding to the shape of the conduit 22. The valve member 28 is pivotally connected along its diameter to a spring which is biased to turn the valve member 28 to allow the flow of fluid 24 through the conduit 22 (the position of FIG. 8B).

In the first configuration, illustrated in FIG. 8A, the temperature of the fluid 24 is less than the Curie point of the valve member 28. Consequently, the valve member 28 retains its magnetic properties. A magnetic circuit extends from the permanent magnets 34, through the conduit 22 and valve member 28, having sufficient flux to attract the valve member 28 to move towards the permanent magnet 34 by rotation, against the action of the spring bias. The valve member 28 at least partially restricts the flow of fluid 24 through the conduit 22.

In the second configuration, illustrated in FIG. 8B, the temperature of the fluid 24 is greater than the Curie point of the valve member 28. Consequently, the valve member 28 loses its magnetic properties and the magnetic flux collapses in the circuit through the permanent magnet 34 and valve member 28 so that the valve member 28 is no longer attracted to the permanent magnet 34. The spring acts to move the valve member 28 to allow the flow of fluid 24 through the conduit 22.

Figure 9A:
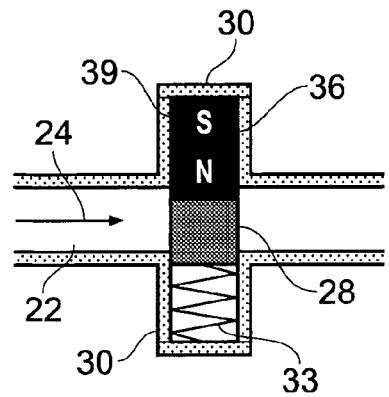
FIG. 9A illustrates a sixth example of a magnetic valve in a first configuration.
Figure 9B:
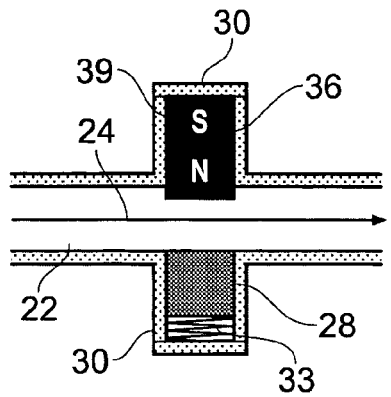
FIG. 9B illustrates a sixth example of a magnetic valve in a second configuration.

FIGS. 9A and 9B illustrate a sixth example of a magnetic valve 26. This example operates in a similar fashion to the embodiment illustrated in FIGS. 4A and 4B. A composite magnet 36 is mounted in a recess 39 of the conduit 22. The composite magnet 36 is a composite of a high temperature magnetic material and a lower temperature ferromagnetic material. The composite magnet 36 may consist of a mixture of magnetic and ferromagnetic particles or may be a laminate of magnetic and ferromagnetic material. In this example, both the composite magnet 36 and the valve member 28 may lose their magnetic properties if the temperature of the fluid is greater than their respective Curie points.

In the first configuration, illustrated in FIG. 9A, the temperature of the fluid 24 is less than the Curie point of the valve member 28 and the Curie point of the permanent magnet 36. Consequently, the valve member 28 and the composite magnet 36 retain their magnetic properties. A magnetic circuit extends from the composite magnet 36, through the conduit 22 and through the valve member 28, having sufficient flux to attract the valve member 28 to move towards the composite magnet 36 thereby at least partially restricting the conduit 22.

In the second configuration, illustrated in FIG. 9B, the temperature of the fluid is greater than the Curie point of the valve member 28 or of the Curie point of the composite magnet 36. Consequently, the magnetic flux in the circuit collapses through the composite magnet 36 and the valve member 28 so that the valve member 28 is no longer attracted to the composite magnet 36. A spring 33 moves the valve member 28 into a recess 30 thereby making the conduit 22 relatively open to allow the flow of fluid therethrough.

Figure 10A:
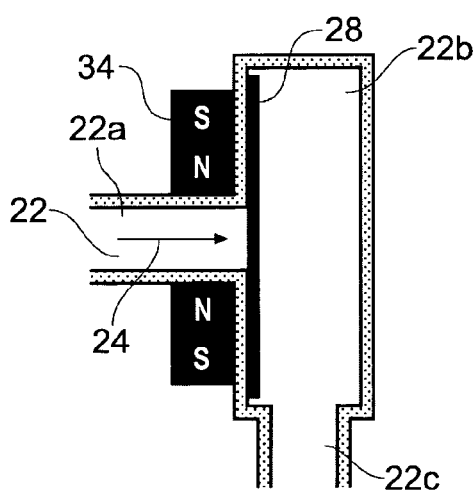
FIG. 10A illustrates a seventh example of a magnetic valve in a first configuration.
Figure 10B:
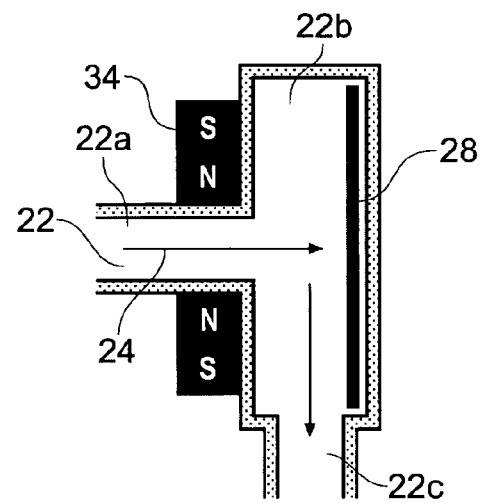
FIG. 10B illustrates a seventh example of a magnetic valve in a second configuration.

FIGS. 10A and 10B illustrate a seventh example of a magnetic valve. In this example, the conduit 22 comprises a generally horizontal portion 22A coupled to a cavity 22B which is in turn coupled to an exit portion 22C. A permanent ring magnet 34 abuts the outside walls of the horizontal portion 22A and of the cavity 22B. A ferromagnetic valve disc is provided in the cavity 22B having a diameter greater than that of the conduit 22.

In the first configuration, illustrated in FIG. 10A, the temperature of the fluid 24 is less than the Curie point of the valve disc 28. Consequently, the valve disc 28 retains its magnetic properties. A magnetic circuit extends from the permanent magnet 34, through the cavity 22B and through the disc valve 28 and having a magnetic flux sufficient to attract the disc valve 28 to move towards the permanent magnet 34, against the force of the fluid in the portion 22A. The disc valve 28 thereby restricts the flow of fluid through the conduit 22.

In the second configuration, illustrated in FIG. 10B, the temperature of the fluid 24 is greater than the Curie point of the valve disc 28. Consequently, the valve disc loses its magnetic properties and the magnetic flux collapses in the circuit through the permanent magnet 34 and the valve disc 28 so that the valve disc is no longer attracted to the permanent magnet 34. The pressure of the fluid 24 moves the valve disc 28 away from the permanent magnet 34 to allow the flow of fluid 24 through the conduit 22.

An advantage provided by this example of a magnetic valve 26 is that it is relatively simple and does not require an actuator (for example a spring) for moving the valve disc 28. Consequently, this example of a magnetic valve 26 may require less maintenance than other examples of magnetic valves.

Figure 11A:
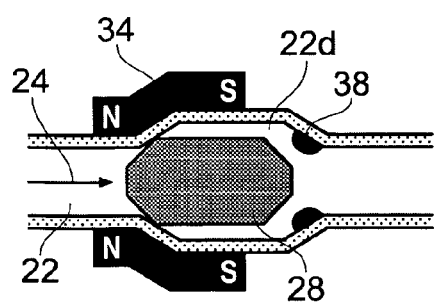
FIG. 11A illustrates an eighth example of a magnetic valve in a first configuration.
Figure 11B:
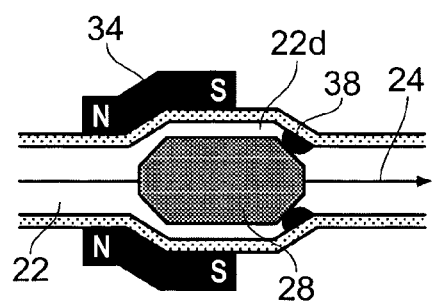
FIG. 11B illustrates an eighth example of a magnetic valve in a second configuration.

FIGS. 11A and 11B illustrate an eighth example of a magnetic valve 26. In this example, the conduit 22 comprises a portion 22D having a diameter larger than that of the conduit 22. A valve member 28 is provided in the portion 22D and is proportioned such that its diameter is larger than the diameter of the conduit 22. A plurality of valve stoppers 38 are provided within the portion 22D and whose function will be explained in the following paragraph. A permanent ring magnet 34 is positioned around the conduit 22, at the upstream end of the portion 22D.

In the first configuration, illustrated in FIG. 11A, the temperature of the fluid 24 is less than the Curie point of the valve member 28. Consequently, the valve member 28 retains its magnetic properties. A magnetic circuit extends from the permanent ring magnet 34, through the portion 22D and through the valve member 28 having sufficient flux to attract the valve member 28 to move towards the permanent ring magnet 34 to restrict the flow of fluid through the conduit 22.

In the second configuration, illustrated in FIG. 11B, the temperature of the fluid is greater than the Curie point of the valve member 28. Consequently, the valve member 28 loses its magnetic properties and the magnetic flux collapses in the circuit through the permanent ring magnet 34 and the valve member 28 so that the valve member 28 is no longer attracted to the permanent ring magnet. The pressure of the fluid 24 moves the valve member 28 in the portion 22D until it comes to rest against the valve stoppers 38. The fluid 24 may flow between the valve member 28 and the valve stoppers 38, so that fluid flow is less restricted than in the condition of FIG. 11A.

In this embodiment, the valve member 28 is solid. This may provide an advantage in that the valve member 28 has a high specific heat capacity which may help to prevent rapid switching of its temperature (and hence its magnetic properties) around the Curie point.

FIGS. 12A and 12B illustrate a ninth example of a magnetic valve 26. This example is similar to the embodiment illustrated in FIGS. 11A and 11B and operates in a similar manner. In this embodiment, the valve member 28 is hollow. Additionally, the permanent magnet is replaced with an electro magnet 40. The use of an electro magnet allows operation at higher temperatures than a permanent magnet. The hollow valve member 28 may respond more quickly to changes in the fluid temperature 24 since its specific heat capacity may be less than that of a solid valve member 28. The thickness of ferromagnetic material of the valve member 28 may be selected to provide a thermal response time chosen for a specific application.

FIGS. 13A and 13B are similar to the embodiment illustrated in FIGS. 11A and 11B. In this embodiment, the valve member 28 is a solid permanent magnet. A circuit 32 comprising ferromagnetic material extends from the conduit 22 and is thermally coupled to a component of the gas turbine engine (as illustrated in FIGS. 3A & 3B).

In the first configuration, illustrated in FIG. 13A, the temperature of a component of a gas turbine engine is less than the Curie point of the ferromagnetic material in the circuit 32. Consequently, the ferromagnetic material in the circuit 32 retains its magnetic properties. A magnetic circuit extends from the circuit 32, through the conduit 22 and the valve member 28 having sufficient flux to attract the valve member toward the circuit 32, thereby restricting the flow of fluid through the conduit 22.

In the second configuration, illustrated in FIG. 13B, the temperature of the component of the gas turbine engine is greater than the Curie point of the ferromagnetic material in the circuit 32. Consequently, the ferromagnetic material in the circuit 32 loses its magnetic properties and the magnetic flux collapses in the circuit through the circuit 32 and the valve member 28 so that the valve member 28 is no longer attracted towards the circuit 32. The pressure of the fluid 24 moves the valve member 28 until it rests against the stoppers 38. Fluid 24 may then move through the conduit 22 between the valve member 28 and the stoppers 38.

FIGS. 14A and 14B illustrate an eleventh embodiment of a magnetic valve. This embodiment is similar to the embodiment illustrated in FIGS. 10A and 10B. In this embodiment the disc valve 28 comprises ferromagnetic material and has a V shape to correspond with the V shaped cavity 22B. The V shape of the disc valve 28 and cavity 22B decrease the possibility of the disc valve becoming misaligned in use and also helps to minimise the air gap between the disc valve 28 and the circuit 32. A permanent ring magnet 34 is coupled to a circuit 32 which comprises ferromagnetic material. The circuit 32 is thermally coupled to the component of the gas turbine engine.

In the first configuration, illustrated in FIG. 14A, the temperature of the fluid 24 is less than the Curie point of the ferromagnetic material in the valve disc 28. Consequently, the valve disc 28 retains its magnetic properties. A magnetic circuit extends from the permanent ring magnet 34, through the cavity 22B and through the disc valve 28 to the circuit 32 and having a magnetic flux sufficient to attract the disc valve 28 to move towards the permanent ring magnet 34, against the force of the fluid in the portion 22A. The disc valve 28 thereby restricts the flow of fluid through the conduit 22.

In the second configuration, illustrated in FIG. 14B, the temperature of the fluid 24 is greater than the Curie point of the ferromagnetic material in the valve disc 28. Consequently, the valve disc loses its magnetic properties and the magnetic flux collapses in the circuit through the permanent ring magnet 34, valve disc 28 and circuit 32 so that the valve disc is no longer attracted to the permanent ring magnet 34. The pressure of the fluid 24 moves the valve disc 28 away from the permanent ring magnet 34 to allow the flow of fluid 24 through the conduit 22.

In each of the above examples, as they relate to the modulation of cooling fluid, the described apparatus may be the sole mechanism for delivering cooling fluid, or may be used to provide fluid in addition to a conventional, unmodulated supply, to ensure that at least some cooling fluid is always available.

The description may have suggested that the valve arrangements will switch open or closed only when the temperature of the fluid or component passes the Curie point of the ferromagnetic material. However, the relationship will depend on the thermal and other characteristics of the arrangement. For example, it may be necessary for the fluid or component to have a temperature in excess of the Curie point, for some time, before the ferromagnetic material heats up sufficiently to reach its Curie point.

Although embodiments of the present invention have been described in the preceding paragraphs with reference to various examples, it should be appreciated that modifications to the examples given can be made without departing from the scope of the invention as claimed. For example, an electromagnet may be used in place of a permanent high temperature magnet where appropriate. The supply of fluid may be any supply of fluid from within or outside of the gas turbine engine 10. The component of the gas turbine engine 10 may be any component of the gas turbine engine that requires a modulated flow of fluid.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A gas turbine engine including a fluid flow control arrangement comprising:
    a supply of fluid;
    a conduit coupled to a component of the gas turbine engine, and the conduit coupled to the supply of fluid for supplying fluid from the supply of fluid to the component;
    a magnetic valve constructed and arranged to at least partially restrict the conduit in response to a temperature of a ferromagnetic material to control the flow of fluid through the conduit, the magnetic valve comprising a valve member, the valve member having at least a first configuration in which the conduit is at least partially restricted and a second configuration in which the conduit is relatively open; and
    at least one member and the valve member forming a magnetic circuit across the conduit, one of the valve member and the at least one member comprising the ferromagnetic material and the other comprising a permanent magnet or electromagnet, wherein the configuration of the valve member is controlled by magnetic flux in the magnetic circuit and is responsive to the temperature of the ferromagnetic material in the magnetic circuit.

2. A gas turbine engine including a fluid flow control arrangement, as claimed in claim 1, wherein the at least one member comprises the ferromagnetic material is thermally coupled to the fluid.

3. A gas turbine engine including a fluid flow control arrangement, as claimed in claim 1, wherein the at least one member comprises the ferromagnetic material is thermally coupled to the component.

4. A gas turbine engine including a fluid flow control arrangement, as claimed in claim 3, wherein the valve member is locatable in a non-rotating part of the gas turbine engine and the magnetic circuit includes at least a part locatable in a rotating part of the gas turbine engine.

5. A gas turbine engine including a fluid flow control arrangement, as claimed in claim 1, wherein the supply of fluid is compressed air or air.

6. A gas turbine engine including a fluid flow control arrangement, as claimed in claim 1, wherein the component is any one of: a turbine blade tip seal, a turbine blade or a nozzle guide vane.

7. A gas turbine engine including a fluid flow control arrangement, as claimed in claim 1, wherein the fluid is air.

8. A gas turbine engine comprising a component and a gas turbine engine fluid flow control arrangement, as claimed in claim 1, wherein the gas turbine engine fluid flow arrangement modulates the supply of cooling fluid to the component.

9. A magnetic valve for a gas turbine engine fluid flow control arrangement, as claimed in claim 1.

10. A method of controlling flow of fluid to a component of a gas turbine engine; the method comprising:
    providing fluid flow to the component of the gas turbine engine via a conduit; and
    partially restricting the conduit in response to a temperature of a ferromagnetic material using at least one member and a magnetic valve comprising a valve member, the valve member having at least a first configuration in which the conduit is at least partially restricted and a second configuration in which the conduit is relatively open, one of the valve member and the at least one member comprising the ferromagnetic material and the other comprising a permanent magnet or electromagnet, the valve member and the at least one member forming a magnetic circuit across the conduit, wherein configuration of the valve member is controlled by magnetic flux in the magnetic circuit and is responsive to the temperature of the ferromagnetic material in the magnetic circuit.

11. A method as claimed in claim 10, further comprising cooling the component by the fluid when the valve member is in at least the second configuration.

12. A method as claimed in claim 10, further comprising providing the fluid to a second component of the gas turbine engine when the valve member is in the first configuration.

13. A method as claimed in claim 12, wherein the second component is a combustor of the gas turbine engine.

14. A gas turbine engine including a fluid flow control arrangement comprising:
- a supply of fluid;
- a conduit coupled to a component of the gas turbine engine, the conduit coupled to the supply of fluid for supplying fluid from the supply of fluid to the component, and a recess in the conduit;
- a magnetic valve constructed and arranged to at least partially restrict the conduit in response to a temperature of a ferromagnetic material thereby controlling the flow of fluid through the conduit, the magnetic valve comprising a valve member movably disposed within the recess, the valve member having at least a first configuration in which the valve member is at least partially withdrawn from the recess to at least partially restrict the conduit and a second configuration in which the valve member is at least partially within the recess so that the conduit is relatively open; and
- at least one member and the valve member forming a magnetic circuit across the conduit, one of the valve member and the at least one member comprising the ferromagnetic material and the other comprising a permanent magnet or electromagnet, wherein the configuration of the valve member is controlled by magnetic flux in the magnetic circuit and is responsive to the temperature of the ferromagnetic material in the magnetic circuit.

* * * * *